United States Patent
Liu et al.

(10) Patent No.: US 10,397,568 B2
(45) Date of Patent: Aug. 27, 2019

(54) METHOD AND APPARATUS FOR PALETTE CODING OF MONOCHROME CONTENTS IN VIDEO AND IMAGE COMPRESSION

(71) Applicant: HFI Innovation Inc., Zhubei, Hsinchu County (TW)

(72) Inventors: Shan Liu, San Jose, CA (US); Jing Ye, San Jose, CA (US); Xiaozhong Xu, State College, PA (US)

(73) Assignee: HFI Innovation Inc., Zhubei, Hsinchu County (TW)

( * ) Notice: Subject to any disclaimer, the term of this patent is extended or adjusted under 35 U.S.C. 154(b) by 0 days.

(21) Appl. No.: 15/549,492

(22) PCT Filed: Feb. 16, 2016

(86) PCT No.: PCT/CN2016/073896
§ 371 (c)(1),
(2) Date: Aug. 8, 2017

(87) PCT Pub. No.: WO2016/131417
PCT Pub. Date: Aug. 25, 2016

(65) Prior Publication Data
US 2018/0041757 A1    Feb. 8, 2018

Related U.S. Application Data
(60) Provisional application No. 62/144,520, filed on Apr. 8, 2015, provisional application No. 62/119,946, filed
(Continued)

(51) Int. Cl.
H04N 7/12        (2006.01)
H04N 11/02    (2006.01)
(Continued)

(52) U.S. Cl.
CPC ............. *H04N 19/11* (2014.11); *H04N 19/13* (2014.11); *H04N 19/136* (2014.11);
(Continued)

(58) Field of Classification Search
None
See application file for complete search history.

(56) References Cited

U.S. PATENT DOCUMENTS 6,987,807 B2    1/2006    Gold
9,654,777 B2 *  5/2017    Guo ...................... H04N 19/50
(Continued)

FOREIGN PATENT DOCUMENTS

| CN | 1452397 A | 10/2003 |
|---|---|---|
| CN | 102523367 A | 6/2012 |
| CN | 104301737 A | 1/2015 |

OTHER PUBLICATIONS

Zhu J et al, "Non-CE1: Palette mode for non-4:4:4 format", 20. JCT-VC Meeting; Feb. 10, 2015-Feb. 18, 2015; Geneva; (Joint Collaborative Team on Video Coding of ISO/IEC JTC1/SC29/WG11 and ITU-T SG.16); URL: http://wftp3.itu.int/av-arch/jctvc-site/. (Year: 2015).*
(Continued)

*Primary Examiner* — Chikaodili E Anyikire
(74) *Attorney, Agent, or Firm* — Oblon, McClelland, Maier & Neustadt, L.L.P.

(57) ABSTRACT

A method and apparatus of palette coding for video data having color formats including a monochrome format are disclosed. The system determines whether the video data is monochrome or non-monochrome. If the video data is monochrome, one or more single-component values corresponding to one or more palette coding parameters are parsed from or signaled in the video bitstream for a single color component of input monochrome video data. Palette
(Continued)

decoding is then applied to the single color component of input monochrome video data using the palette coding parameters. If the video data is non-monochrome, one or more multi-component values corresponding to one or more palette coding parameters are parsed from or signaled in the video bitstream for multiple color components of input non-monochrome video data. Palette decoding is applied to the multiple color components of input non-monochrome video data using the palette coding parameters.

20 Claims, 3 Drawing Sheets

Related U.S. Application Data on Feb. 24, 2015, provisional application No. 62/117,106, filed on Feb. 17, 2015.

(51) Int. Cl.
*H04N 11/04* (2006.01)
*H04N 19/11* (2014.01)
*H04N 19/593* (2014.01)
*H04N 19/136* (2014.01)
*H04N 19/13* (2014.01)
*H04N 19/186* (2014.01)
*H04N 19/70* (2014.01)

(52) U.S. Cl.
CPC ......... *H04N 19/186* (2014.11); *H04N 19/593* (2014.11); *H04N 19/70* (2014.11)

(56) References Cited

U.S. PATENT DOCUMENTS

| | | |
|---|---|---|
| 2005/0008224 A1 | 1/2005 | Caruso et al. |
| 2009/0080688 A1 | 3/2009 | Au et al. |
| 2015/0262404 A1* | 9/2015 | Laude ................. G06T 9/00 |
| | | 375/240.12 |
| 2016/0234498 A1* | 8/2016 | Misra ................. H04N 19/46 |

OTHER PUBLICATIONS

International Search Report dated May 17, 2016, issued in application No. PCT/CN2016/073896.

* cited by examiner

METHOD AND APPARATUS FOR PALETTE CODING OF MONOCHROME CONTENTS IN VIDEO AND IMAGE COMPRESSION

CROSS REFERENCE TO RELATED APPLICATIONS

The present invention claims priority to U.S. Provisional Patent Application, Ser. No. 62/117,106, filed on Feb. 17, 2015, U.S. Provisional Patent Application, Ser. No. 62/119, 946, filed on Feb. 24, 2015 and U.S. Provisional Patent Application, Ser. No. 62/144,520, filed on Apr. 8, 2015. The U.S. Provisional Patent Applications are hereby incorporated by reference in their entireties.

FIELD OF THE INVENTION

The present invention relates to palette coding for video data. In particular, the present invention relates to palette coding for video data comprising a monochrome format in video and image compression.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include screen content coding (SCC). Due to specific characteristics of screen contents, coding tools have been developed and demonstrate significant gains in coding efficiency. Among them, the color index coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the color index coding becomes very effective for screen content materials. Related key color index coding techniques are briefly reviewed as follows.

Major-Color-Based Screen Content Coding

The major-color-based screen content coding is disclosed in JCTVC-O0108 (Guo, et al., "*RCE4: Test1. Major-color-based screen content coding*", Joint Collaborative Team on Video Coding (JCT-VC) of ITU-T SG 16 WP 3 and ISO/IEC JTC 1/SC 29/WG 11, 16th Meeting: San Jose, Calif., USA, Jan. 9-17, 2014, Document: JCTVC-P0108). Major-color-based screen content coding is performed on a CU basis. The encoding process is as follows:

Selecting Major Colors

A very simple but efficient histogram based algorithm is used to classify the pixels. In specific, the most significant L peak values in the histogram are selected as major colors, and the pixel values that are close to a major color will be quantized to the major color. Other pixels which do not belong to any major color sets are escape pixels, which will also be quantized before coding. For lossless coding, both of the quantization processes are not used. For each pixel, a color index is assigned to indicate which color set it belongs to. The color index may also be referred as an index for convenience when the term will not cause any confusion. If L major colors are used, the values of major colors 0 to (L−1) are signaled for the set of L major colors and the value of major color N is signaled for the escape pixel set.

Encoding the Color Index

After classification, the pixels of a block can be converted into color indices according to the major color set selected. A predictive coding method is applied to the indices, where a pixel line can be predicted by three different modes, including horizontal mode (i.e., copy index mode), vertical mode (i.e., copy above mode) and normal mode (i.e., escape mode).

Copy Index Mode

In copy index mode, starting from the first pixel, one or more consecutive indices are copied from the first pixel. The index of the first pixel is signaled.

Copy Above Mode

In this mode, one or more consecutive indices are copied from above pixel line.

Escape Mode

When an escape pixel is encountered (signaled by the largest index in major color set), its corresponding pixel value is coded right after the index. There may be more than 1 escape pixels and in different color values in the CU. For different escape pixel locations, the pixel values of escape pixels may be different.

Palette Mode Coding

A palette-based coding technique is disclosed in JCTVC-P0198 (Guo et al., "*RCE4: Results of Test 2 on Palette Mode for Screen Content Coding*", Joint Collaborative Team on Video Coding (JCT-VC) of ITU-T SG 16 WP 3 and ISO/IEC JTC 1/SC 29/WG 11, 16th Meeting: San Jose, Calif., USA, Jan. 9-17, 2014, Document: JCTVC-P0198). The palette-based coding is performed on a CU basis. The encoding process is as follows:

Transmission of the Palette:

the palette size is first transmitted followed by the palette elements. The maximum palette size is set to 24.

Transmission of Pixel Values:

the pixels in the CU are encoded in a raster scan order. For each position, a flag is first transmitted to indicate whether the "run mode" (i.e., "copy-index mode" in this disclosure) or "copy-above mode" is being used.

"Run mode": In "run mode" (i.e., "copy-index mode" in this disclosure), a palette index is first signaled followed by "palette_run" (e.g., M). No further information needs to be transmitted for the current position and the following M positions as they have the same palette index as signaled. The palette index (e.g., i) is shared by all three color components, which means that the reconstructed pixel values are (Y, U, V)=(paletteY[i], paletteU[i], paletteV[i]) if the color space corresponds to YUV.

"Copy-Above Mode":

In "copy-above mode", a value "copy_run" (e.g., N) is transmitted to indicate that for the following N positions (including the current one), the palette index is equal to the palette index of the one that is at the same location in the row above.

Transmission of Residue:

the palette indices transmitted are converted back to pixel values and used as the prediction. Residue information is transmitted using HEVC residue coding and is added to the prediction for the reconstruction.

Copy from Previous Row Above

Another index coding mode, called "copy from previous row", is disclosed in JCTVC-R0202 (Zou et al., "*Non-SCCE*3: *Copy from previous row mode for palette coding*", Joint Collaborative Team on Video Coding (JCT-VC) of ITU-T SG 16 WP 3 and ISO/IEC JTC 1/SC 29/WG 11, 18th Meeting: Sapporo, Japan, Jun. 30-Jul. 9, 2014, Document: JCTVC-R0202). This method enables to copy pixels from previously coded rows beyond the row above in the current CU. To achieve a better coding efficiency, all the previous coded rows are available as reference according to JCTVC-R0202. Accordingly, this mode is called "copy from previous row". This mode is added in the available palette mode candidate list. The row index information is coded when the current string chooses "copy from previous row" mode. The row index is coded using truncated binary codeword. Basically, a shorter codeword is designed for the row which is near to the current row. Similar to other modes, the matching length is coded in the bitstream.

In JCTVC-O0108 and JCTVC-P0198, similar palette based coding methods are disclosed. These references use slightly different terms for related parameters. The term "palette" in JCTVC-O0108 and the term "major color sets" in JCTVC-P0198 is referred as "major color table" in this disclosure. The term "palette index" in JCTVC-O0108 and the term "color index" in JCTVC-P0198 are referred as "color index" in this disclosure. The color indices related to the current coding unit are referred as "index map".

For a run of indices in the index map, there are several elements that need to be signaled, including:
1) Run type: either it is a copy above run or a copy index run.
2) Palette index: in a copy index run, it is used to signal what index is used for this run.
3) Run length: the length of this run for both copy above and copy index type.
4) Escape pixel: if there N (N>=1) escape pixels in the run, the N pixel values need to be signaled for these N escape pixels.

In JCTVC-T0065 (Karczewicz, et al., *Non CE1: Grouping Palette Indices At Front*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0065), a syntax signaling is disclosed, where all the palette indices are grouped together. The number of palette indices is signaled first, following by the palette indices.

The coding of palette index run type and run length in the HEVC Screen Content Coding specification (Joshi, et al., *High Efficiency Video Coding (HEVC) Screen Content Coding*: Draft 2, Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S1005) is as follows:

TABLE 1

| | Note |
|---|---|
| if( indexMax > 0 && scanPos > = nCbS &&<br>    palette_run_type_flag[ xcPrev ][ ycPrev ]<br>    != COPY_ABOVE_MODE ) {<br>        palette_run_type_flag[ xC ][ yC ]<br>} | (1-1) |
| if( palette_run_type_flag[ xC ][ yC ] = =<br>COPY_INDEX_MODE && | |

TABLE 1-continued

| | Note |
|---|---|
|     adjustedIndexMax > 0)<br>    palette_index_idc | (1-2) |
| if( indexMax > 0 ) {<br>    maxPaletteRun = nCbS * nCbS − scanPos − 1<br>    if( maxPaletteRun > 0 ) {<br>        palette_run_msb_id_plus1 | (1-3) |
|         if( palette_run_msb_id_plus1 > 1 )<br>            palette_run_refinement_bits<br>} | (1-4) |

As shown in Table 1, syntax elements for the palette run type (i.e., palette_run_type_flag[xC][yC]) and palette index (i.e., palette_index_idc) are incorporated for each occurrence as indicated by Notes (1-1) and (1-2). Two syntax elements palette_run_msb_id_plus1 and palette_run_refinement_bits are used to signal the run length corresponding to a MSB (most significant bit) part and refinement part respectively as indicated by Notes (1-3) and (1-4) in Table 1.

During the Course of Screen Content Coding (SCC) development, various video coding tools have been described, including the "Intra picture block copy" (IntraBC) technique. The IntraBC technique was first disclosed in JCTVC-M0350 (Budagavi et al., *AHG*8: *Video coding using Intra motion compensation*, Joint Collaborative Team on Video Coding (JCT-VC) of ITU-T SG16 WP3 and ISO/IEC JTC 1/SC 29/WG11 13th Meeting: Incheon, KR, 18-26 Apr. 2013, Document: JCTVC-M0350). An example according to JCTVC-M0350 is shown in FIG. 1, where a current coding unit (CU, 110) is coded using Intra MC (motion compensation). The prediction block (120) is located from the current CU and a displacement vector (112). In this example, the search area is limited to the current CTU (coding tree unit), the left CTU and the left-left CTU. The prediction block is obtained from the already reconstructed region. Then, the displacement vector, also named motion vector (MV) or block vector (BV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process.

In JCTVC-M0350, the IntraBC is different from the motion compensation used for Inter prediction in at least the following areas:
BVs are restricted to be 1-D for IntraBC (i.e., either horizontal or vertical) while Inter prediction uses 2-D motion estimation.
Binarization is fixed length for IntraBC while Inter prediction uses exponential-Golomb.
IntraBC introduces a new syntax element to signal whether the BV is horizontal or vertical.

Based on JCTVC-M0350, some modifications are disclosed by Pang, et al., in *Non-RCE*3: *Intra Motion Compensation with* 2-*D MVs*, Joint Collaborative Team on Video Coding (JCT-VC) of ITU-T SG 16 WP 3 and ISO/IEC JTC 1/SC 29/WG 11, 14th Meeting: Vienna, AT, 25 Jul. 2-Aug. 2013, Document: JCTVC-N0256 (hereinafter JCTVC-N0256). Firstly, the IntraBC is extended to support 2-D MVs, so that both vertical and horizontal MV components can be non-zero at the same time. This provides more flexibility to IntraBC than the original approach, where the MV is restricted to be strictly horizontal or vertical.

In JCTVC-N0256, two BV coding methods are disclosed:

Method 1—Block vector prediction. The left or above BV is selected as the BV predictor and the resulting motion vector difference (BVD) is coded. A flag is used to indicate whether the BVD is zero. When BVD is not zero, exponential-Golomb codes of the 3rd order are used to code the remaining absolute level of the BVD. Another flag is used to code the sign.

Method 2: No block vector prediction. The BV is coded using the exponential-Golomb codes that are used for BVD in HEVC.

Another difference disclosed in JCTVC-N0256 is that the 2-D IntraBC is further combined with the pipeline friendly approach:

1. No interpolation filters are used.
2. BV search area is restricted. Two cases are disclosed:
   a. Search area is the current CTU and the left CTU or
   b. Search area is the current CTU and the rightmost 4 column samples of the left CTU.

Among the proposed methods in JCTVC-N0256, the 2-D IntraBC, the removal of interpolation filters, and the search area constraint to the current CTU and the left CTU have been adopted in a draft HEVC SCC standard.

The decoding and parsing process according to JCTVC-R1005 are briefly described as follows.

1. Signaling of the palette:
   1.1 Signal 'palette sharing flag' first which indicates palette predictor is used as the current palette. If it is true, the following process in steps 1.2 to 1.4 is skipped.
   1.2 Signal 'reused flag's indicate which elements of palette predictor are used in current palette.
   1.3 Signal 'number of non-predicted elements' which indicate how many elements in current palette are not predicted from palette predictor.
   1.4 Signal value of each non-predicted element.
2. Signaling of the color index map:
   2.1 The pixels in the block can be coded in horizontally raster scan order, vertically raster order, horizontally traverse scan order and vertically traverse order.
   2.2 For each position, a flag is first transmitted to indicate which prediction mode between 'copy above mode' and 'new run mode' is being used.
   2.3 When 'copy above mode' is used, 'number of runs' follows the flag. For the number of runs the indices are same as those in above line along the scan order
   2.4 When 'new run mode' is used, 'index' is signaled after the flag.
      2.4.1 When the 'index' is 'ESCAPE', the pixel value itself is signaled.
      2.4.2 When the 'index' is in the palette table, 'number of runs' is signaled. For the number of runs the indices are same as the index signaled.

In the existing palette coding practice, the palette coding is always applied to underlying video data with multi-color formats, such as YUV or RGB. There is no mentioning regarding palette coding for the monochrome video data. It is desirable to develop techniques of palette coding for monochrome video data.

BRIEF SUMMARY OF THE INVENTION

A method and apparatus of palette coding for video data having color formats including a monochrome format are disclosed. In one embodiment, the system determines whether the video data is monochrome or non-monochrome. If the video data is monochrome, one or more single-component values corresponding to one or more palette coding parameters are parsed from or signaled in the video bitstream for a single color component of input monochrome video data. Palette decoding is then applied to the single color component of input monochrome video data using the palette coding parameters. If the video data is non-monochrome, one or more multi-component values corresponding to one or more palette coding parameters are parsed from or signaled in the video bitstream for multiple color components of input non-monochrome video data. Palette decoding is applied to the multiple color components of input non-monochrome video data using the palette coding parameters. A color-format syntax element may be parsed from or signaled in the video bitstream to identify whether the video data is monochrome or non-monochrome.

In one example, the palette coding parameter corresponds to the palette entry for a palette table. The palette entry can be parsed from or signaled in a coding unit (CU). The color-format syntax element can be used to determine whether a corresponding single-component value or corresponding multi-component values are parsed or signaled for each palette entry. The color-format syntax element may correspond to a syntax element, chroma format idc, from which a color-format parameter ChromaArrayType is derived and used to indicate the color format of the current video sequence. Furthermore, a variable indicating the number of color component values signaled for each palette entry can be derived based on ChromaArrayType. The variable is set to 1 if ChromaArrayType has a value indicating a monochrome format and the variable is set to 3 if ChromaArrayType has a value indicating one of non-monochrome formats.

In another example, the palette coding parameter corresponds to the escape value for pixels not belonging to a palette table. Each escape value can be parsed from or signaled in a CU. The color-format syntax element may be used to determine whether one corresponding single-component value or one corresponding multi-component value is parsed for each escape value.

In yet another example, the palette coding parameter corresponds to the palette predictor used for predictive coding of the palette table of a CU. The palette predictor can be parsed from a PPS (picture parameter set) or a SPS (sequence parameter set). The color-format syntax element may correspond to syntax element, monochrome_palette_flag that is parsed from or signaled in the PPS or the SPS. A variable indicating a number of color component values signaled for each palette entry may be derived based on monochrome_palette_flag. The variable is set to 1 if monochrome_palette_flag has a value indicating a monochrome format and the variable is set to 3 if monochrome_palette_flag has a value indicating a non-monochrome format.

DETAILED DESCRIPTION OF THE INVENTION

Figure 1:
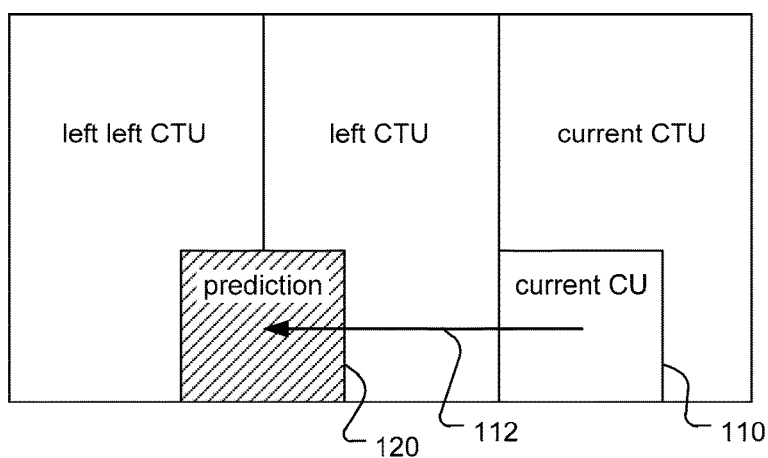
FIG. 1 illustrates an example of Intra Block Copy (IntraBC) coding used for screen content coding (SCC).

The following description is of the best-contemplated mode of carrying out the invention. This description is made for the purpose of illustrating the general principles of the invention and should not be taken in a limiting sense. The scope of the invention is best determined by reference to the appended claims.

Monochrome Palette Coding Mode

When the color format of a video is monochrome, also referred as monochrome color in this disclosure, having only one component in each pixel location, the various syntax tables for signaling monochrome palette information are disclosed to deal with coding of such video using the palette coding mode.

Embodiment 1: No Palette Mode when Color Format is Monochrome

An exemplary syntax table is shown in Table 2. As shown in Table 2, the palette flag palette_mode_flag[x0][y0] will not be signaled as indicated by Note (2-2) if the color format is monochrome (i.e., ChromaArrayType=0) as indicated by Note (2-1).

TABLE 2

| | Note |
|---|---|
| if( palette_mode_enabled_flag && ChromaArrayType > 0 &&    CuPredMode[ x0 ][ y0 ] = = MODE_INTRA) | (2-1) |
|  palette_mode_flag[ x0 ][ y0 ] | (2-2) |
|  if( palette_mode_flag[ x0 ][ y0 ] ) | |
|   palette_coding( x0, y0, nCbS ) | |
|  else { | |
|   ...... | |

The above syntax table may be added to the coding unit syntax as shown in Table 3. Table 4 illustrates another coding unit syntax table with palette mode disabled for monochrome video. However, an additional condition is added to test for allowing palette mode, where the additional condition corresponds to that the size of the current luma coding block is less than 64 (i.e., log 2CbSize<6) as indicated in Note (4-1).

TABLE 3

| | Note |
|---|---|
| coding_unit( x0, y0, log2CbSize ) { | |
|  ...... | |
|  if( palette_mode_enabled_flag && ChromaArrayType > 0 &&    CuPredMode[ x0 ][ y0 ] == MODE_INTRA) | |
|   palette_mode_flag[ x0 ][ y0 ] | |
|   if( palette_mode_flag[ x0 ][ y0 ] ) | |
|    palette_coding( x0, y0, nCbS ) | |
|   else { | |
|    ...... | |

TABLE 4

| | Note |
|---|---|
| coding_unit( x0, y0, log2CbSize ) { | |
|  ...... | |
|  if( palette_mode_enabled_flag && ChromaArrayType > 0 &&    CuPredMode[ x0 ][ y0 ] == MODE_INTRA &&    log2CbSize < 6) | (4-1) |
|   palette_mode_flag[ x0 ][ y0 ] | |
|   if( palette_mode_flag[ x0 ][ y0 ] ) | |
|    palette_coding( x0, y0, nCbS ) | |
|   else { | |
|    ...... | |

Embodiment 2: Padding for Chroma Positions

For monochrome video sequences, the luma pixel positions do not have their corresponding chroma components. In order to utilize 3-component based palette coding, the two chroma positions for each pixel location are padded with a value. In one embodiment, all the chroma pixel locations of a picture use a single value N, where N can be any pixel value. At the decoder, after converting a 3-component based palette index back to a pixel, the two chroma pixel components are discarded.

For example, the syntax for signaling the palette entry does not need to be changed for the monochrome contents. Instead, the chroma pixels can be padded with 0 or other fixed values for monochrome contents. An exemplary syntax table for palette entry incorporating the above embodiment is shown in Table 5.

TABLE 5

| | Note |
|---|---|
| palette_coding( x0, y0, nCbS ) { | |
|  ... | |
|  if( paletteNumPredictedEntries < palette_max_size ) | |
|   palette_num_signalled_entries | |
|  for( cIdx = 0; cIdx < 3; cIdx++ ) | |
|   for( i = 0; i < palette_num_signalled_entries; i++ ) | |
|    palette_entry | |
|  ... | |
| } | |

An exemplary syntax table for escape pixel incorporating the above embodiment is shown in Table 6.

TABLE 6

| | Note |
|---|---|
| palette_coding( x0, y0, nCbS ) { | |
|  ... | |
|  for( cIdx = 0; cIdx < 3; cIdx++ ) | |
|   palette_escape_val | |
|   PaletteEscapeVal[ cIdx ][ xR ][ yR ] =    palette_escape_val | |
|  } | |
|  .... | |

Embodiment 3: No Signaling for Chroma Components of Escape Pixel

When an escape pixel is signaled, the pixel values in all three components need to be coded. For monochrome video coding using palette mode, the chroma components of the escape pixel will not be coded according to this embodiment. An exemplary syntax table is shown in Table 7. As shown in Table 7, the escape pixel value palette_escape_val (indicated by Note (7-2)) for the chroma components will not be signaled if the color format is monochrome as indicated by Note (7-1). In this embodiment, only the luma values of escape pixels for monochrome contents will be signaled.

TABLE 7

| | Note |
|---|---|
| palette_coding( x0, y0, nCbS ) {<br>    palette_share_flag[ x0 ][ y0 ]<br>    ...<br>    while( scanPos < nCbS * nCbS ) {<br>    ...<br>        xC = x0 + travScan[ scanPos ][ 0 ]<br>        yC = y0 + travScan[ scanPos ][ 1 ]<br>    ...<br>        if( palette_run_type_flag[ xC ][ yC ] = = COPY_INDEX_MODE &&<br>            paletteIndex = = indexMax ) {<br>            PaletteSampleMode[ xR ][ yR ] = ESCAPE_MODE<br>            PaletteIndexMap[ xR ][ yR ] = paletteIndex<br>            for( cIdx = 0; cIdx < 3; cIdx++ ) {<br>                if((xC%2 = = 0 && yC%2 = = 0 && ChromaArrayType = = 1) \|\|<br>                  cIdx = = 0 \|\| ChromaArrayType = = 3 \|\|<br>                  (ChromaArrayType = = 0 && cIdx = = 0 ) ) {<br>                palette_escape_val<br>                  PaletteEscapeVal[ cIdx ][ xR ][ yR ] = palette_escape_val<br>                }<br>            }<br>        }<br>    ...<br>        runPos++<br>        scanPos++<br>    }<br>    }<br>} | <br><br><br><br><br><br><br><br><br><br><br><br>(7-1)<br><br><br>(7-2) |

Embodiment 4: No Signaling for Chroma Components of New Palette Entry

When a new palette entry is not in the current palette predictor, its pixel values of all components need to be coded. For monochrome video coding using palette coding mode, the chroma components of the new palette entry will not be coded according to this embodiment. At the decoder side, the suggested padding value N for chroma locations is used to reconstruct this new palette entry as a 3-component pixel.

An exemplary syntax table is shown in Table 8. As shown in Table 8, the pixel entry palette_entry (indicated by Note (8-2)) will be signaled only for the luma component (i.e., cIdx=0) if the color format is monochrome (i.e., ChromaArrayType=0) as indicated by Note (8-1).

TABLE 8

| | Note |
|---|---|
| if( paletteNumPredictedEntries < palette_max_size )<br>    palette_num_signalled_entries<br>for( cIdx = 0; cIdx < 3; cIdx++ )<br>    if( ( cIdx == 0 && ChromaArrayType = = 0 ) \|\|<br>    ChromaArrayType > 0 )<br>        for( i = 0; i < palette_num_signalled_entries; i++ )<br>            palette_entry<br>} | <br><br><br>(8-1)<br><br><br>(8-2) |

Embodiment 5: Extending the Use of Current Palette Coding Scheme to Monochrome Format Syntax Table of Palette Coding for Monochrome Contents According to this embodiment, the existing palette coding scheme can be applied to monochrome format. An exemplary syntax table incorporating this embodiment is shown in Table 9, where the color format check (i.e., ChromaArrayType) is omitted as indicated in Note (9-1). In other words, palette coding is allowed for all color formats including monochrome. Table 10 illustrates another coding unit syntax table similar to Table 9. However, an additional condition is added to the test for allowing palette mode, where the additional condition corresponds to that the size of the current luma coding block is less than 64 (i.e., log 2CbSize<6) as indicated in Note (10-1).

TABLE 9

| | Note |
|---|---|
| coding_unit( x0, y0, log2CbSize ) {<br>......<br>    if( palette_mode_enabled_flag && CuPredMode[ x0 ][y0<br>    ] = =<br>        MODE_INTRA)<br>        palette_mode_flag[ x0 ][ y0 ]<br>    if( palette_mode_flag[ x0 ][ y0 ] )<br>        palette_coding( x0, y0, nCbS )<br>    else {<br>...... | <br><br>(9-1) |

TABLE 10

| | Note |
|---|---|
| coding_unit( x0, y0, log2CbSize ) {<br>......<br>    if( palette_mode_enabled_flag && CuPredMode[ x0 ][<br>    y0 ] = =<br>        MODE_INTRA && log2CbSize < 6)<br>        palette_mode_flag[ x0 ][ y0 ]<br>    if( palette_mode_flag[ x0 ][ y0 ] )<br>        palette_coding( x0, y0, nCbS )<br>    else {<br>...... | <br><br>(10-1) |

Encoding Process

An exemplary encoding process incorporating this embodiment is disclosed as follows. The palette in the existing SCC draft standard utilizes a 3-component entry table. In other words, each color index is associated with three values, representing Y, Cb and Cr. For monochrome format, Cb and Cr values do not exist. In order to extend the 3-component entry table to the monochrome format, all Cb and Cr values are set to be a fixed non-negative integer. This integer can be any valid pixel value, depending on bit-depth. For example, for 8-bit content, this value shall be greater than or equal to zero, and less than 256. For 10-bit content, this value shall be greater than or equal to zero and less than 1024. For example, all Cb and Cr values are set to be 128 for an 8-bit data. In another example, all Cb and Cr values are set to be 0. After that, the Y-Cb-Cr combo values are used to derive the palette followed by palette coding processes. When a pixel is decided to be coded as an escape index, only the Y value is signaled. The pseudo Cb and Cr values are not signaled.

An exemplary syntax table is illustrated in Table 11. As shown in Table 11, the escape value palette_escape_val is signaled as indicated by Note (11-2) for the monochrome format in a same way as if it were a 3-component color format as indicated by Note (11-1).

TABLE 11

| | Note |
|---|---|
| palette_coding( x0, y0, nCbS ) { <br>  palette_share_flag[ x0 ][ y0 ] <br> ... <br>  while( scanPos < nCbS * nCbS ) { <br> ... <br>    xC = x0 + travScan[ scanPos ][ 0 ] <br>    yC = y0 + travScan[ scanPos ][ 1 ] <br> ... <br>        if( palette_run_type_flag[ xC ][ yC ] == COPY_INDEX_MODE && <br>            paletteIndex == indexMax ) { <br>          PaletteSampleMode[ xR ][ yR ] = ESCAPE_MODE <br>          PaletteIndexMap[ xR ][ yR ] = paletteIndex <br>          for( cIdx = 0; cIdx < 3; cIdx++ ) { <br>            if( ( xC % 2 == 0 && yC % 2 == 0 && ChromaArrayType == 1 ) \|\| <br>                ( xC % 2 == 0 && ChromaArrayType == 2 ) \|\| <br>                cIdx == 0 \|\| ChromaArrayType == 3 ) { <br>              palette_escape_val <br>              PaletteEscapeVal[ cIdx ][ xR ][ yR ] = palette_escape_val <br>            } <br>          } <br>        } <br> ... <br>    runPos++ <br>    scanPos++ <br>    } <br>  } <br> } | <br><br><br><br><br><br><br><br><br><br><br><br>(11-1)<br><br><br>(11-2) |

In another example, when the content is monochrome, only the luma component needs to be signaled for the palette entry. The pseudo Cb and Cr values are not signaled. Another exemplary syntax table is illustrated in Table 12, where the palette entry palette_entry is signaled as indicated by Note (12-2) only for the luma component (i.e., cIdx==0) when the color format is monochrome (i.e., ChromaArrayType==0) as indicated by Note (12-1).

TABLE 12

| | Note |
|---|---|
| palette_coding( x0, y0, nCbS ) { <br> ... <br>  if( paletteNumPredictedEntries < palette_max_size ) <br>    palette_num_signalled_entries <br>  for( cIdx = 0; cIdx < 3; cIdx++ ) <br>    for( i = 0; i < palette_num_signalled_entries; i++ ) | |

TABLE 12-continued

| | Note |
|---|---|
|      if( ( cIdx == 0 && ChromaArrayType == 0 ) <br>         \|\| ChromaArrayType > 0 ) <br>        palette_entry <br> ... <br> } | (12-1)<br><br>(12-2) |

Another exemplary syntax table is illustrated in Table 13, where the number of color components (i.e., numComps) is set to 1 for the monochrome format (i.e., ChromaArrayType==0) and set to 3 for 3-component color formats as indicated by Note (13-1). The palette entry palette_entry is signaled as indicated by Note (13-3) according to the number of color components as indicated by Note (13-2).

TABLE 13

| | Note |
|---|---|
| palette_coding( x0, y0, nCbS ) { <br> ... <br>  if( paletteNumPredictedEntries < palette_max_size ) <br>    palette_num_signalled_entries <br>  numComps = ( ChromaArrayType == 0 ) ? 1 : 3 <br>  for( cIdx = 0; cIdx < numComps; cIdx++ ) <br>    for( i = 0; i < palette_num_signalled_entries; i++ ) <br>      palette_entry <br> ... <br> } | <br><br><br><br>(13-1)<br>(13-2)<br><br>(13-3) |

In another example of palette entry signaling for the monochrome contents, pseudo Cb and Cr values can be set to a fixed value. Therefore, the luma component and the pseudo Cb and Cr values of the palette table are all signaled using the conventional syntax table.

Decoding and Reconstruction Process

The palette decoding and parsing processes can be the same as in the conventional SCC draft standard. Each index is associated with Y, Cb and Cr values. However, only Y values are used for reconstruction while Cb and Cr values are ignored. When a pixel is ESCAPE coded, only Y value is decoded and used for reconstruction of the decoded picture.

Palette Predictor Updating Process

According to the embodiments of the present invention, only the Y component of the palette predictor is updated. An exemplary updating process for the monochrome contents is shown as follows.

The variable PreviousPaletteSize is set to the CurrentPaletteSize. When CurrentPaletteSize is greater than 0, variables PredictorPaletteSize and PredictorPaletteEntries are modified as follows:

```
for( i = 0; i < currentPaletteSize; i++ )
    for( cIdx = 0; cIdx < 3; cIdx++ )
        if( ( cIdx == 0 && ChromaArrayType = = 0 ) ||
            ChromaArrayType > 0 )
            newPredictorPaletteEntries[ cIdx ][ i ] =
                CurrentPaletteEntries[ cIdx ][ i ]
            newPredictorPaletteSize = currentPaletteSize
for( i = 0; i < PredictorPaletteSize && newPredictorPaletteSize <
        PaletteMaxPredictorSize; i++ )
    if( PalettePredictorEntryReuseFlag[ i ] ! = 1 ) {
        for( cIdx = 0; cIdx < 3; cIdx++ )
            if( ( cIdx == 0 && ChromaArrayType = = 0 ) ||
                ChromaArrayType > 0 )
                newPredictorPaletteEntries[ cIdx ]
                    [ newPredictorPaletteSize ] =
                    PredictorPaletteEntries[ cIdx ][ i ]
                newPredictorPaletteSize ++
    }
for( cIdx = 0; cIdx < 3; cIdx++ )
    if( ( cIdx == 0 && ChromaArrayType = = 0 ) ||
        ChromaArrayType > 0 )
        for( i = 0; i < newPredictorPaletteSize; i++ )
            PredictorPaletteEntries[ cIdx ][ i ] =
                newPredictorPaletteEntries[ cIdx ][ i ]
        PredictorPaletteSize = newPredictorPaletteSize
```

As shown in the above pseudo codes for palette updating, only the Y component is updated for the monochrome contents (i.e., cIdx==0 && ChromaArrayType==0). Another example of updating process is as follows.

The variable numComps is derived as follows:

numComps=(ChromaArrayType==0)?1:3

The variables PredictorPaletteSize and PredictorPaletteEntries are modified as follows.

```
for( i = 0; i < CurrentPaletteSize; i++ )
    for( cIdx = 0; cIdx < numComps; cIdx++ )
        newPredictorPaletteEntries[ cIdx ][ i ] =
            CurrentPaletteEntries[ cIdx ][ i ]
    newPredictorPaletteSize = CurrentPaletteSize
for( i = 0; i < PredictorPaletteSize && newPredictorPaletteSize <
        PaletteMaxPredictorSize; i++ )
    if( PalettePredictorEntryReuseFlag[ i ] ! = 1 ) {
        for( cIdx = 0; cIdx < numComps; cIdx++ )
            newPredictorPaletteEntries[ cIdx ]
                [ newPredictorPaletteSize ] =
                PredictorPaletteEntries[ cIdx ][ i ]
            newPredictorPaletteSize ++
    }
for( cIdx = 0; cIdx < numComps; cIdx++ )
    for( i = 0; i < newPredictorPaletteSize; i++ )
```

```
        PredictorPaletteEntries[ cIdx ][ i ] =
            newPredictorPaletteEntries[ cIdx ][ i ]
    PredictorPalette Size = newPredictorPaletteSize
```

As shown in the above pseudo codes for palette updating, the number of color components (i.e., numComps) is set to 1 for the monochrome format (i.e., ChromaArrayType==0) and set to 3 for 3-component color formats according to the process "numComps=(ChromaArrayType==0)?1:3". The updating process will update only the Y component for the monochrome contents.

The conventional palette predictor updating process may also be used for monochrome and non-monochrome formats. There is no change needed for the current palette predictor update process.

The derivation of the current palette for monochrome format is disclosed. The variable CurrentPaletteEntries[cIdx][i] specifies the i-th element in the current palette for the color component cIdx. Exemplary pseudo codes of the current palette derivation for the monochrome format according to an embodiment of the present invention are shown as follow.

First, the variable numComps representing the number of color components is derived according to: "numComps=(ChromaArrayType==0)?1:3". Therefore, for the monochrome format (i.e., ChromaArrayType==0), numComps is equal to 1. Otherwise, numComps is equal to 3. Therefore, the following pseudo codes will only assign one palette value to the Y component (i.e., cIdx=0) for the monochrome format and assign three palette values to the three components respectively for non-monochrome format.

```
numPredictedPaletteEntries = 0
for( i = 0; i < PredictorPaletteSize; i++ )
    if( PalettePredictorEntryReuseFlag[ i ] == 1 ) {
        for( cIdx = 0; cIdx < numComps ; cIdx++ )
            CurrentPaletteEntries[ cIdx ]
                [ numPredictedPaletteEntries ] =
                PredictorPaletteEntries[ cIdx ][ i ]
            numPredictedPaletteEntries++
    }
for( cIdx = 0; cIdx < numComps ; cIdx++ )
    for( i = 0; i < num_signalled_palette_entries; i++ )
        CurrentPaletteEntries[ cIdx ][ numPredictedPaletteEntries + i ] =
            palette_entry
```

Embodiment 6: Disallowing Palette Coding for Monochrome Format in SPS

A flag "palette_mode_enabled_flag" in SPS can be signaled to specify whether palette coding is enabled or not for the current video sequence. The flag can be inferred to be 0 when the sequence is monochrome, i.e. ChromaArrayType equal to zero. Therefore, it does not need to be signal the flag for the monochrome contents. Alternatively, the flag is still signaled. However, the flag is forced to be zero when the sequence is a monochrome format.

Embodiment 7: Palette Predictor Initialization for Monochrome

In the existing HEVC SCC draft standard, syntax element palette_entry specifies the value of a component in a palette entry for the current palette.

The variable PredictorPaletteEntries[cIdx][i] specifies the i-th element in the predictor palette for the color component cIdx. The variable CurrentPaletteEntries[cIdx][i] specifies the i-th element in the current palette for the color component cIdx and is derived as follows:

```
numPredictedPaletteEntries = 0
for( i = 0; i < PredictorPaletteSize; i++ )
    if( PalettePredictorEntryReuseFlag[ i ] = = 1 ) {
        for( cIdx = 0; cIdx < 3; cIdx++ )
            CurrentPaletteEntries[ cIdx ]
                [ numPredictedPaletteEntries ] =
                    PredictorPaletteEntries[ cIdx ][ i ]
            numPredictedPaletteEntries++
    }
for( cIdx = 0; cIdx < 3; cIdx++ )
    for( i = 0; i < num_signalled_palette_entries; i++ )
        CurrentPaletteEntries[ cIdx ][ numPredictedPaletteEntries + i ] =
            palette_entry
```

In the conventional approach, palette predictor initializer is signaled in the PPS level, which implies the palette predictor information being signaled for each picture. In order to improve the coding efficiency, an SPS level palette predictor initializer is disclosed. In one embodiment, SPS level palette predictor values are signal and can be used by video data within the sequence as palette predictors. One exemplary sps_scc_extension( ) syntax table is shown in Table 14, where syntax element sps_palette_predictor_initializer_present_flag is signaled to indicate whether palette predictor initializer exists in the SPS SCC extension syntax table as indicated by Note (14-1). If it is equal to 1 as indicated by Note (14-2), parameters related to the palette predictor initializer and the values of palette predictor initializer are signaled as indicated by syntax lines from Note (14-3) through Note (14-4). The parameters related to the palette predictor initializer include parameters "sps_luma_bit_depth_entry_minus8", "sps_chroma_bit_depth_entry_ minus8" and "sps_num_palette_predictor_initializer_minus1". A set of initial palette predictor values are signaled by "sps_palette_predictor_initializers[ ][ ]". While specific syntax elements are used in Table 14, these syntax elements serve as illustration purpose for an embodiment of the present invention and shall not construed as limitations of the present invention.

TABLE 14

| | Note |
|---|---|
| sps_scc_extensions( ) { | |
| ...... | |
|     sps_palette_predictor_initializer_present_flag | (14-1) |
|     if( sps_palette_predictor_initializer_present_flag ) { | (14-2) |
|         sps_luma_bit_depth_entry_minus8 | (14-3) |
|         sps_chroma_bit_depth_entry_minus8 | |
|         sps_num_palette_predictor_initializer_minus1 | |
|         numComps = ( ChromaArrayType = = 0 ) ? 1 : 3 | |
|         for( i = 0; i <= | |
|         sps_num_palette_predictor_initializer_minus1; | |
|         i++ ) | |
|             for( comp = 0; comp < numComps; comp++ ) | |
|                 sps_palette_predictor_initializers[ i ][ comp ] | |
|     } | (14-4) |
|     ...... | |
| } | |

In the current SCM 4.0 (JCTVC-T1014: Joshi, et al., Screen content coding test model 4(SCM 4), Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T1014). The palette predictor initialization process is as follows. Outputs of this process are the initialized palette predictor variables PredictorPaletteSize and PredictorPaletteEntries. The PredictorPaletteSize is derived as follows:
    If palette_predictor_initializer_present_flag is equal to 1,
        PredictorPaletteSize is set equal to num_palette_predictor_initializer_minus1 plus 1.
    Otherwise (palette_predictor_initializer_present_flag is equal to 0),
        PredictorPaletteSize is set equal to 0.
The array PredictorPaletteEntries is derived as follows:
    If palette_predictor_initializer_present_flag is equal to 1,
        for(i=0; i<PredictorPaletteSize; i++)
            for(comp=0; comp<3; comp++)
                PredictorPaletteEntries[i][comp]=palette_predictor_initializers[i][comp].
    Otherwise (i.e., palette_predictor_initializer_present_flag is equal to 0),
        PredictorPaletteEntries is set equal to 0.

An embodiment of the present invention discloses palette predictor initialization for the monochrome format. When the video data is a monochrome format, the chroma values in the palette table are not signaled. Also, the chroma_bit_depth_entry_minus8 is not signaled. One exemplary syntax table for pps_scc_extensions( ) is as shown in Table 15. In Table 15, flag monochrome_palette_flag is signaled as indicated by Note (15-1) to indicate whether the video data is monochrome. When the video data is not monochrome as indicated by Note (15-2), parameter chroma_bit_depth_entry_minus8 is signaled as indicated by Note (15-3). In other words, parameter chroma_bit_depth_entry_minus8 is not signaled if the video data is monochrome. The number of color component numComps is determined as indicated by Note (15-4). Depending on the number of color components, either one predictor value or three predictor values are signaled as indicated by syntax lines from Note (15-5) through Note (15-6).

TABLE 15

| | Note |
|---|---|
| pps_scc_extensions( ) { | |
|     residual_adaptive_colour_transform_enabled_flag | |
|     if( residual_adaptive_colour_transform_enabled_flag ) { | |
|         pps_slice_act_qp_offsets_present_flag | |
|         pps_act_y_qp_offset_plus5 | |
|         pps_act_cb_qp_offset_plus5 | |
|         pps_act_cr_qp_offset_plus3 | |
|     } | |
|     palette_predictor_initializer_present_flag | |
|     if( palette_predictor_initializer_present_flag ) { | |
|         monochrome_palette_flag | (15-1) |
|         luma_bit_depth_entry_minus8 | |
|         if( !monochrome_palette_flag ) | (15-2) |
|             chroma_bit_depth_entry_minus8 | (15-3) |
|         num_palette_predictor_initializer_minus1 | |
|         numComps = monochrome_palette_flag ? 1 : 3 | (15-4) |
|         for( i = 0; i <= | (15-5) |
|         num_palette_predictor_initializer_minus1; i++ ) | |
|             for( comp = 0; comp < numComps; comp++ ) | |
|                 palette_predictor_initializers[ i ] [ comp ] | (15-6) |
|     } | |
| } | |

Initialization Process for Palette Predictor Variables

The palette predictor initialization process according to this embodiment is disclosed. Outputs of this process are the initialized palette predictor variables PredictorPaletteSize and PredictorPaletteEntries. The PredictorPaletteSize is derived as follows:

If palette_predictor_initializer_present_flag is equal to 1,
PredictorPaletteSize is set to num_palette_predictor_initializer_minus1 plus 1.
Otherwise (i.e., palette_predictor_initializer_present_flag is equal to 0),
PredictorPaletteSize is set equal to 0.

The variable numComps representing the number of color components is derived as follows:

numComps=(ChromaArrayType==0)?1:3

The array PredictorPaletteEntries is derived as follows:
If palette_predictor_initializer_present_flag is equal to 1,
for(i=0; i<PredictorPaletteSize; i++)
for(comp=0; comp<numComps; comp++)
PredictorPaletteEntries[i][comp]=palettepredictor initializers[i][comp].
Otherwise (palette_predictor_initializer_present_flag is equal to 0),
PredictorPaletteEntries is set equal to 0.

As shown above, according to the number of color components, either one predictor value or three predictor values are copied from each entry of the PPS level palette predictor (i.e., palette_predictor_initializers[i][comp]) to the entry of the current palette predictor (i.e., PredictorPaletteEntries[i][comp]).

For the SPS palette initializer signaling, the syntax table needs to be modified as shown in Table 16 for the monochrome format. As shown in Table 16, the parameter for the luma component, sps_luma_bit_depth_entry_minus8 is always signaled as indicated by Note (16-2) if the SPS level palette predictor present flag is equal to 1 as indicated by Note (16-1). On the other hand, chroma related parameter sps_chroma_bit_depth_entry_minus8 is signaled as indicated by Note (16-4) only if the video data is not monochrome as indicated by Note (16-3). The number of color components (i.e., numComps) is determined according to ChromaArrayType as indicated by Note (16-5). Depending on the number of color components, either one predictor value or three predictor values are signaled for each SPS palette predictor entry as indicated by syntax lines from Note (16-6) through Note (16-7).

TABLE 16

| | Note |
|---|---|
| sps_scc_extensions( ) { | |
| ...... | |
|    sps_palette_predictor_initializer_present_flag | |
|    if( sps_palette_predictor_initializer_present_flag ) { | (16-1) |
|       sps_luma_bit_depth_entry_minus8 | (16-2) |
|       if(ChromaArrayType) | (16-3) |
|          sps_chroma_bit_depth_entry_minus8 | (16-4) |
|       sps_num_palette_predictor_initializer_minus1 | |
|       numComps = ( ChromaArrayType = = 0 ) ? 1 : 3 | (16-5) |
|       for( i = 0; i <= sps_num_palette_predictor_initializer_minus1; i++ ) | (16-6) |
|          for( comp = 0; comp < numComps; comp++ ) | |
|             sps_palette_predictor_initializers[ i ][ comp ] | (16-7) |
|    } | |
| ...... | |
| } | |

The SPS level syntax table in Table 14 may also be used.

For the PPS palette initializer signaling, an exemplary syntax table is shown in Table 17 for the monochrome format. As shown in Table 17, the parameter for the luma component, monochrome_palette_flag is signaled as indicated by Note (17-2) if the PPS level palette predictor present flag is equal to 1 as indicated by Note (17-1). The chroma related parameter pps_chroma_bit_depth_entry_minus8 is signaled as indicated by Note (17-4) only if the video data is not monochrome (i.e., !monochrome_palette_flag equal 1) as indicated by Note (17-3). The number of color components (i.e., numComps) is determined according to ChromaArrayType as indicated by Note (17-5). Depending on the number of color components, either one predictor value or three predictor values are signaled for each PPS palette predictor entry as indicated by syntax lines from Note (17-6) through Note (17-7).

TABLE 17

| | Note |
|---|---|
| pps_scc_extensions( ) { | |
|    residual_adaptive_colour_transform_enabled_flag | |
|    if( residual_adaptive_colour_transform_enabled_flag ) { | |
|       pps_slice_act_qp_offsets_present_flag | |
|       pps_act_y_qp_offset_plus5 | |
|       pps_act_cb_qp_offset_plus5 | |
|       pps_act_cr_qp_offset_plus3 | |
|    } | |
|    pps_palette_predictor_initializer_present_flag | |
|    if(pps_palette_predictor_initializer_present_flag ) { | (17-1) |
|       monochrome_palette_flag | (17-2) |
|       pps_luma_bit_depth_entry_minus8 | |
|       if( !monochrome_palette_flag ) | (17-3) |
|          pps_chroma_bit_depth_entry_minus8 | (17-4) |
|       pps_num_palette_predictor_initializer_minus1 | |
|       numComps = monochrome_palette_flag ? 1 : 3 | (17-5) |
|       for( i = 0; i <= | (17-6) |
|       num_palette_predictor_initializer_minus1; i++ ) | |
|          for( comp = 0; comp < numComps; comp++ ) | |
|             pps_palette_predictor_initializers[ i ][ comp ] | (17-7) |
|    } | |
| } | |

Initialization Process for Palette Predictor Variables with Initializer in SPS and PPS Outputs of this process are the initialized palette predictor variables PredictorPaletteSize and PredictorPaletteEntries. The PredictorPaletteSize is derived as follows:

If sps_palette_predictor_initializer_present_flag is equal to 1 and pps_palette_predictor_initializer_present_flag is equal to 0,
PredictorPaletteSize is set equal to
sps_num_palette_predictor_initializer_minus1 plus 1.
If pps_palette_predictor_initializer_present_flag is equal to 1, PredictorPaletteSize is set equal to
pps_num_palette_predictor_initializer_minus1 plus 1.
Otherwise (i.e., sps_palette_predictor_initializer_present_flag and pps_palette_predictor_initializer_present_flag are both equal to 0),
PredictorPaletteSize is set equal to 0.
The variable numComps is derived as follows:

numComps=(ChromaArrayType==0)?1:3

The array PredictorPaletteEntries is derived as follows:

```
- If sps_palette_predictor_initializer_present_flag is equal to 1 and
         pps_palette_predictor_initializer_present_flag is
         equal to 0,
    for( i = 0; i < PredictorPaletteSize; i++ )
       for( comp = 0; comp < numComps; comp++ )
          PredictorPaletteEntries[ i ][ comp ] =
             sps_palette_predictor_initializers[ i ][ comp ]
- If pps_palette_predictor_initializer_present_flag is equal to 1,
    for( i = 0; i < PredictorPaletteSize; i++ )
       for( comp = 0; comp < numComps; comp++ )
          PredictorPaletteEntries[ i ][ comp ] =
             pps_palette_predictor_initializers[ i ]
                [ comp ]
- Otherwise (i.e., sps_palette_predictor_initializer_present_flag and
             pps_palette_predictor_initializer_present_flag
             are both equal to 0 ),
PredictorPaletteEntries is set equal to 0.
```

IntraBC Memory Bandwidth Reduction Consideration

In another aspect of the present invention, the issue of IntraBC memory bandwidth reduction is addressed. Several embodiments are disclosed as follows.

Embodiment 1: IntraBC Reference Flag in CU or CTU Level

In HEVC standard with palette coding mode, the unfiltered version of reconstructed blocks are stored and used as reference data for IntraBC coded blocks. However, for blocks coded in the Inter/Intra prediction modes, the filtered version (i.e., by deblocking (DF) and sample adaptive offset (SAO)) of reconstructed blocks are stored and used as reference data. Therefore, there may be a need to store both filtered and unfiltered version of reconstructed data. For each Coding Unit (CU) or Coding Tree Unit (CTU), a flag is used to indicate whether this block will be used for reference block by subsequent blocks coded in the IntraBC mode. If not, there is no need to store the unfiltered version of the reconstruction samples of this block. Such flags can be grouped together in the slice header. When parsing the slice header, the status regarding whether all the CUs or CTUs within the current slice to be used for IntraBC reference is known.

In this method, this group of flags can be entropy coded using CABAC (context-adaptive binary arithmetic coding) with context modeling, or bypass coded without context modeling. When using context, each of these flags can be depending on the value of its left and/or above neighbor flags for context modeling. It may also depend on the value of the last coded flag.

In a variation of Embodiment 1, the CU or CTU will only store one version of the reconstructed samples, according to the status of the flag. If it is marked as used for IntraBC reference, it will not use filtering operations such as Deblocking or SAO.

Embodiment 2: IntraBC Reference Flag in Slice Level

A slice level flag can be used to signal whether the IntraBC reference flags in CUs or CTUs of this slice are present. Similarly, the IntraBC reference flag control can be signaled in picture level or sequence level to indicate whether the IntraBC reference flags in CUs or CTUs of this picture or sequence are present.

Embodiment 3: Estimated IntraBC Reference Usage for CU or CTU

According to this embodiment, whether a CU or CTU in a current picture will be used for IntraBC reference is estimated. For example, the status of CUs or CTUs in previous coded pictures can be used to predict whether a CU or CTU in a current picture will be used for IntraBC reference. Such prediction is valid when both the current picture and the collocated picture have similar "prediction mechanism". The previously coded picture with minimum POC (picture order count) difference to the current picture may be selected as the previous coded picture. The status of collocated CUs or CTUs regarding whether they are used for IntraBC reference is checked and used to predict or estimate the status of the CUs or CTUs of the current picture. For example, if some pixels in CTU(x, y) with spatial location (x, y) in the previous picture are used for IntraBC reference, the flag for the CTU of same location in the current picture is set to be "used for IntraBC reference". In another example, the current picture and the previous picture may share a similar prediction mode, such as both pictures have Inter reference pictures or IntraBC reference picture.

The criterion used, in terms of number of pixels in a CU or CTU being IntraBC referenced, can be based on a threshold. When the number of pixels being IntraBC referenced in a CU or CTU of the previously coded picture exceeds the threshold, the CU or CTU of current picture is predicted to be used for IntraBC reference. This threshold can be a dependent on some coding parameters, such as QP (quantization parameter), CU or CTU size.

According to this embodiment, the correspondence between the pixels in the previously code pictures and the pixels in a CU or CTU of the current picture is not necessarily collocated exactly. For example, a spatial window centered by the collocated CU or CTU in the previously coded picture can be used to collect the statistics of number of pixels used for IntraBC reference. In another example, a temporal window containing more than one previously coded picture can be used. In yet another example, both spatial and temporal neighboring pixels can be used.

Figure 2:
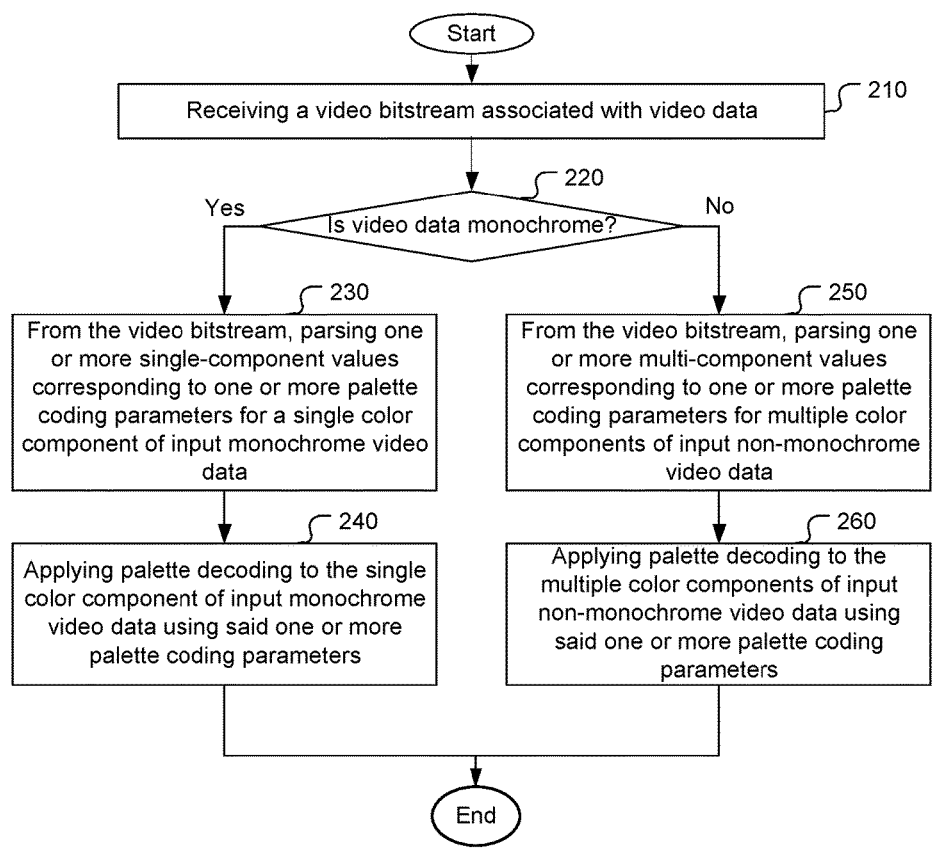
FIG. 2 illustrates an exemplary flowchart of a video decoder for palette coding incorporating an embodiment of the present invention.

FIG. 2 illustrates an exemplary flowchart of a video decoder for palette coding incorporating an embodiment of the present invention. The system receives a video bitstream associated with the video data in step 210. Whether the video data is monochrome is checked in step 220. If the video data is monochrome (i.e., the "Yes" path), steps 230 and 240 are performed. Otherwise (i.e., the "No" path), steps 250 and 260 are performed. In step 230, one or more single-component values corresponding to one or more palette coding parameters are parsed from the video bitstream for a single color component of input monochrome video data. In step 240, palette decoding is applied to the single color component of input monochrome video data using said one or more palette coding parameters. In step 250, one or more multi-component values corresponding to one or more palette coding parameters are parsed from the video bitstream for multiple color components of input non-monochrome video data. In step 260, palette decoding is applied to the multiple color components of input non-monochrome video data using said one or more palette coding parameters.

Figure 3:
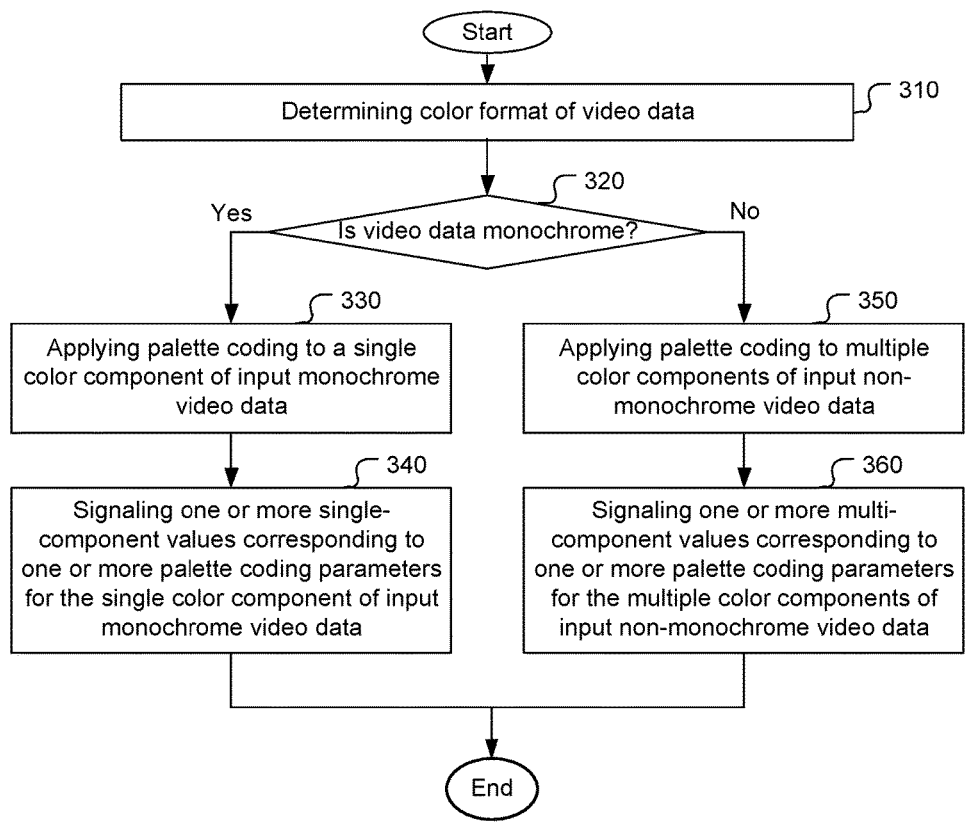
FIG. 3 illustrates an exemplary flowchart of a video encoder for palette coding incorporating an embodiment of the present invention.

FIG. 3 illustrates an exemplary flowchart of a video encoder for palette coding incorporating an embodiment of the present invention. The system determines with the color format of the video data in step 310. Whether the video data is monochrome is checked in step 320. If the video data is monochrome (i.e., the "Yes" path), steps 330 and 340 are performed. Otherwise (i.e., the "No" path), steps 350 and 360 are performed. In step 330, palette coding is applied to a single color component of input monochrome video data. In step 340, one or more single-component values corresponding to one or more palette coding parameters are signaled for the single color component of input monochrome video data. In step 350, palette coding is applied to multiple color components of input non-monochrome video data. In step 360, one or more multi-component values corresponding to one or more palette coding parameters are signaled for the multiple color components of input non-monochrome video data.

The flowcharts shown are intended to illustrate an example of palette coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of decoding video data using palette coding for a video coding system, comprising:

receiving a video bitstream associated with the video data;

obtaining a color-format syntax element from the video bitstream;

determining whether a picture of the video data is monochrome or non-monochrome based on the color-format syntax element;

in response to determining that the picture of the video data is monochrome:

from the video bitstream, obtaining first palette coding parameters for a particular color component of the picture; and generating, by circuitry of the video coding system, a first palette table in a monochrome format for palette decoding the picture using the first palette coding parameters, wherein a variable indicating a number of color component values for each palette entry in the first palate table is set to a first value in response to the color-format syntax element indicating that the picture of the video data is monochrome;

in response to determining that the picture of the video data is non-monochrome:

from the video bitstream, obtaining second palette coding parameters for multiple color components of the picture; and generating, by the circuitry of the video coding system, a second palette table in a multiple-component format for palette decoding the picture using the second palette coding parameters, wherein a variable indicating a number of color component values for each palette entry in the second palate table is set to a second value that is different from the first value in response to the color-format syntax element indicating that the picture of the video data is non-monochrome; and outputting a decoded presentation of the picture that is decoded using the first palette table or the second palette table.

2. The method of claim 1, wherein the first palette coding parameters correspond to one or more palette entries for the first palette table, or the second palette coding parameters correspond to one or more palette entries for the second palette table.

3. The method of claim 2, wherein the first palette coding parameters or the second palette coding parameters are parsed from a coding unit (CU) of the picture.

4. The method of claim 1, wherein the first palette coding parameters or the second palette coding parameters include at least one pixel value for one or more escape pixels of the picture.

5. The method of claim 1, wherein
the first palette coding parameters or the second palette coding parameters correspond to one or more palette predictors used for predictive coding of at least one palette table of a coding unit (CU) of the picture.

6. The method of claim 1, wherein
the first palette coding parameters or the second palette coding parameters are parsed from a PPS (picture parameter set) or a SPS (sequence parameter set) of the video bitstream.

7. The method of claim 6, wherein
the color-format syntax element corresponds to a flag parsed from the PPS or the SPS.

8. The method of claim 7, further comprising:
setting the variable indicating the number of color component values for each palette entry to 1 responsive to the flag having a first flag value indicating a monochrome format; and
setting the variable to 3 responsive to the flag having a second flag value indicating a non-monochrome format.

9. A method of encoding video data using palette coding for a video coding system, comprising:
receiving input video data;
determining whether a picture of the input video data is monochrome or non-monochrome;
including a color-format syntax element in a video bitstream to identify whether the picture of the input video data is monochrome or non-monochrome;
in response to determining that the picture of the input video data is monochrome:
generating, by circuitry of the video coding system, a first palette table in a monochrome format for palette encoding the picture, wherein a variable indicating a number of color component values for each palette entry in the first palate table is set to a first value based on the color-format syntax element indicating that the picture of the video data is monochrome;
generating, by the circuitry of the video coding system, first palette coding parameters for a particular color component of the picture for reconstructing the first palette table; and
including the first palette coding parameters in the video bitstream associated with the input video data;
in response to determining that the picture of the input video data is non-monochrome:
generating, by the circuitry of the video coding system, a second palette table in a multiple-component format for palette encoding the picture, wherein a variable indicating a number of color component values for each palette entry in the second palate table is set to a second value that is different from the first value based on the color-format syntax element indicating that the picture of the video data is non-monochrome;
generating, by the circuitry of the video coding system, second palette coding parameters for multiple color components of the picture for reconstructing the second palette table; and
including the second palette coding parameters in the video bitstream associated with the input video data; and
outputting the video bitstream associated with the input video data.

10. The method of claim 9, wherein
the first palette coding parameters correspond to one or more palette entries for the first palette table, or the second palette coding parameters correspond to one or more palette entries for the second palette table.

11. The method of claim 9, wherein
the first palette coding parameters or the second palette coding parameters are signaled in a coding unit (CU).

12. The method of claim 9, wherein
the first palette coding parameters or the second palette coding parameters include at least one pixel value for one or more escape pixels of the picture.

13. The method of claim 9, wherein
the first palette coding parameters or the second palette coding parameters correspond to one or more palette predictors used for predictive coding of at least one palette table of a coding unit (CU) of the picture.

14. The method of claim 9, wherein
the first palette coding parameters or the second palette coding parameters are signaled in a PPS (picture parameter set) or a SPS (sequence parameter set) of the video bitstream.

15. The method of claim 14, wherein
the color-format syntax element corresponds to a flag signaled in the PPS or the SPS.

16. An apparatus for decoding video data using palette coding in a video coding system, comprising one or more electronic circuits configured to:
receive a video bitstream associated with the video data;
obtain a color-format syntax element from the video bitstream;
determine whether a picture of the video data is monochrome or non-monochrome based on the color-format syntax element;
in response to determining that the picture of the video data is monochrome:
from the video bitstream, obtain first palette coding parameters for a particular color component of the picture; and
generate a first palette table in a monochrome format for palette decoding the picture using the first palette coding parameters, wherein a variable indicating a number of color component values for each palette entry in the first palate table is set to a first value in response to the color-format syntax element indicating that the picture of the video data is monochrome;
in response to determining that the picture of the video data is non-monochrome:
from the video bitstream, obtain second palette coding parameters for multiple color components of the picture; and
generate a second palette table in a multiple-component format for palette decoding the picture using the second palette coding parameters, wherein a variable indicating a number of color component values for each palette entry in the second palate table is set to a second value that is different from the first value in response to the color-format syntax element indicating that the picture of the video data is non-monochrome; and
output a decoded presentation of the picture that is decoded using the first palette table or the second palette table.

17. The apparatus of claim 16, wherein
the first palette coding parameters or the second palette coding parameters correspond to one or more palette predictors used for predictive coding of at least one palette table of a coding unit (CU) of the picture.

18. The apparatus of claim 16, wherein
the first palette coding parameters or the second palette coding parameters are parsed from a PPS (picture parameter set) or a SPS (sequence parameter set) of the video bitstream.

19. The apparatus of claim 18, wherein
the color-format syntax element corresponds to a flag parsed from the PPS or the SPS.

20. The apparatus of claim 19, wherein the one or more electronic circuits are configured to:
set the variable indicating the number of color component values for each palette entry to 1 responsive to the flag having a first flag value indicating a monochrome format; and
set the variable to 3 responsive to the flag having a second flag value indicating a non-monochrome format.

* * * * *